Patented Jan. 25, 1949

2,460,066

UNITED STATES PATENT OFFICE 2,460,066

COBALT SULFATE RELATIVE HUMIDITY INDICATORS

Paul Bell Davis, Baltimore, Md., assignor to The Davison Chemical Corporation, Baltimore, Md.

No Drawing. Application February 7, 1945, Serial No. 576,717

8 Claims. (Cl. 252—408)

This invention relates to indicators and more particularly has reference to compositions for indicating the presence and quantity of moisture in a gaseous atmosphere.

An object of this invention is to provide a composition for indicating the presence and quantity of moisture in a gaseous atmosphere within predetermined limits.

Another object of this invention is to provide a composition capable of exhibiting a definite color break when exposed to a gaseous atmosphere having a relative humidity ranging from about 0 to 5%.

A further object of this invention is to provide a moisture indicator formed of cobalt sulphate associated with an adsorbent carrier such as silica gel.

Still another object of this invention is to provide a moisture indicator formed of an adsorbent material such as silica gel having cobalt sulphate incorporated in the pores thereof, in which the adsorbent characteristics of the carrier, its moisture content, the color changing characteristics of the cobalt sulphate and its concentration are correlated to produce a definite break or change in the color of the indicator when exposed to a gaseous atmosphere having a predetermined relative humidity or range of relative humidity.

It is also an object of this invention to provide a method of making a color changing moisture indicator.

Other objects of this invention will appear hereinafter.

In accordance with the present invention it has been found that by treating an adsorbent carrier such as silica gel with a solution of cobalt sulphate and drying the so treated carrier, an indicator gel is obtained which has a definite color and which upon exposure to a gaseous atmosphere such as air having a predetermined relative humidity will change its color.

It has also been found in accordance with the present invention that by correlating the adsorptive characteristics of the carrier, its final moisture content as fixed by the temperatures at which the impregnated carrier is dried, or dried and activated, and the concentration of cobalt sulphate in the carrier, the color of the resulting indicator before exposure to a humid atmosphere can be adjusted or controlled and also that the color which the indicator will assume after exposure to an atmosphere having a predetermined relative humidity can be controlled.

The present invention is directed principally to moisture indicators formed of a carrier such as silica gel impregnated with about 2% cobalt sulphate and having a definite color change or break when exposed to a gaseous atmosphere such as air having a relative humidity in the range of 0 to 5%.

In preparing an indicator according to the present invention a standard silica gel made by washing an acid reacting hydrogel with an acidic wash water at a temperature of about 150° F., drying and then activating at a temperature of about 850° F. and sized to about 6 to 16 mesh was employed. This silica gel in the activated form was first treated by exposing it to a humid atmosphere having a high relative humidity to saturate the gel with moisture to such an extent that upon contacting it with a liquid it would not disintegrate like it would if freshly activated gel were contacted with a liquid.

After saturation with moisture to an approximate total volatile content of about 30% the gel was impregnated with an aqueous solution of cobalt sulphate. It has been found that by first saturating the gel with moisture to the extent indicated, wetting of the gel with the cobalt sulphate solution can be effected by using only about 50 ml. of solution per kilogram of gel. The cobalt sulphate solution used was of such concentration that by impregnating about one kilogram of the gel with about 50 ml. of solution the gel had a $CoSO_4$ content of about 2% on the dry basis.

By varying the temperatures at which the gel containing about 2% $CoSO_4$ was dried and activated, a color change or break occurred upon exposing the so treated gel to atmospheres having different relative humidities.

When the gel having a $CoSO_4$ content of about 2% was dried at a temperature of about 350° F. and activated at a temperature of about 725° F., a product was obtained which had a color of about 10.0 PB 4/10 Munsell color value. This indicator gel was found to be particularly suitable for the indication of the presence of moisture in a gaseous atmosphere such as air when the content of the moisture was such that the atmosphere had a relative humidity ranging between 1 to 3%. For instance, when this indicator gel was exposed to an atmosphere having a relative humidity of about 1%, the color changed to about 10.0 P 6/6 M. C. V. When this same indicator gel was exposed to an atmosphere having a relative humidity of about 3%, the color changed to about 7.5 RP 7/6 M. C. V.

By varying the temperatures at which the gel impregnated with cobalt sulphate to an extent of about 2% was heated for drying and activation, an indicator gel is obtained which has a definite color break when exposed to an atmosphere having a relative humidity of 3 to 5%. For instance, by drying the impregnated gel at a temperature of about 300° F. and activating it at a temperature of about 850° F., an indicator gel is obtained having a color of about 10.0 PB 3/10 M. C. V. Upon exposing the indicator gel to an atmosphere having a relative humidity of about 3%, the color changed to 10.0 P 5/8 M. C. V. Upon exposing this same indicator gel to an atmosphere having a relative humidity of about 5%, the color further changed to about 5.0 RP 6/10 M. C. V.

An indicator particularly useful for detecting a relative humidity of about 0 to 5% in a gaseous atmosphere was prepared by heating a gel having 2% cobalt sulphate incorporated therein to a drying temperature of 300° F. and to an activating temperature of about 600° F. The thus treated gel had a color of about 10.0 PB 3/8 M. C. V. Upon exposing this gel to an atmosphere having a relative humidity of about 5%, the color changed to about 7.5 RP 6/10 M. C. V. The same gel when exposed to an atmosphere having a relative humidity of about 10% changed color to about 10.0 RP 6/10 M. C. V.

In the drying and activating of the above-mentioned gels, the impregnated gels were held at the temperatures mentioned for about three hours.

While silica gel has been described as the carrier of the chromatic chemical, a porous glass may be used as described in my copending application, Serial No. 576,726, (now abandoned), filed of even date herewith.

Such porous glass is made from a glass containing from 60 to 82% SiO₂, 20 to 35% B₂O₃ and 5 to 10% alkali oxide heat treated at a temperature of 525 or 600° C. to cause the glass to be separated into two phases, one of which is rich in boric oxide and alkali oxide and is soluble in acids, and the other of which is very rich in silica and substantially insoluble in acids. By treating the so heat treated glass with an acid such as hydrochloride, nitric or sulphuric acids maintained at a temperature at or near the boiling point thereof, the acid reacts with the alkaline phase of the glass forming a number of microscopic pores throughout the body thereof. This porous glass may be used in place of the silica gel hereinbefore mentioned.

The values given for the various colors in the foregoing description refer to the system of color notation devised by A. H. Munsell and published by Munsell Color Company, Inc., Baltimore, Maryland, as the Munsell Book of Color, abridged edition, revised 1942.

From the foregoing description, it will be appreciated that the present invention provides an indicator gel particularly suitable for the indication of the relative humidity of an atmosphere. It will also be appreciated that the present invention provides methods of preparing and utilizing indicator gels having color breaks when exposed to atmospheres of different relative humidities.

I claim:

1. A method of preparing a quantitative relative humidity indicator comprising impregnating activated adsorbent silica gel with about 2% of cobalt sulphate, and heat treating the impregnated gel at about 300–850° F., said indicator changing color when exposed to an atmosphere having a relative humidity of 0–5%.

2. A quantitative relative humidity indicator consisting essentially of silica gel impregnated with 2% of cobalt sulphate, said indicator having been prepared by the process of claim 1.

3. A method of preparing a quantitative relative humidity indicator comprising impregnating activated silica gel with about 2%, on a dry basis, of cobalt sulphate, drying the impregnated silica gel at a temperature of about 300° F., and activating the impregnated silica gel at a temperature of about 600° F., said indicator changing color when exposed to an atmosphere having a relative humidity of 0–5%.

4. A quantitative relative humidity indicator consisting essentially of silica gel impregnated with about 2%, on a dry basis, of cobalt sulphate, said indicator changing color when exposed to an atmosphere having a relative humidity ranging from zero to 5% and being prepared by the method of claim 3.

5. A method of preparing a quantitative relative humidity indicator comprising impregnating activated silica gel with about 2%, on a dry basis, of cobalt sulphate, drying the impregnated silica gel at a temperature of about 350° F., and activating the impregnated silica gel at a temperature of about 725° F., said indicator changing color when exposed to an atmosphere having a relative humidity of 1–3%.

6. A quantitative relative humidity indicator consisting essentially of silica gel impregnated with about 2%, on a dry basis, of cobalt sulphate, said indicator changing color when exposed to an atmosphere having a relative humidity ranging from 1 to 3% and being prepared by the method of claim 5.

7. A method of preparing a quantitative relative humidity indicator comprising impregnating activated silica gel with about 2%, on a dry basis, of cobalt sulphate, drying the impregnated silica gel at a temperature of about 300° F., and activating the impregnated silica gel at a temperature of about 850° F., said indicator changing color when exposed to an atmosphere having a relative humidity of 3–5%.

8. A quantitative relative humidity indicator consisting essentially of silica gel impregnated with about 2%, on a dry basis, of cobalt sulphate, said indicator changing color when exposed to an atmosphere having a relative humidity ranging from 3 to 5% and being prepared by the method of claim 7.

PAUL BELL DAVIS.

REFERENCES CITED

The following references are of record in the file of this patent:

UNITED STATES PATENTS

| Number | Name | Date |
|---|---|---|
| 1,947,381 | Connolly et al. | Feb. 13, 1934 |
| 1,976,875 | Connolly et al. | Oct. 16, 1934 |
| 2,210,862 | Tronstad | Aug. 6, 1940 |
| 2,214,354 | Snelling | Sept. 10, 1940 |

FOREIGN PATENTS

| Number | Country | Date |
|---|---|---|
| 393,094 | Great Britain | June 1, 1933 |
| 280,934 | Great Britain | Feb. 18, 1929 |

OTHER REFERENCES

The Chemical Trade Journal and Chemical Engineer, July 14, 1939, page 31.